(12) United States Patent
Hara et al.

(10) Patent No.: US 9,522,709 B2
(45) Date of Patent: Dec. 20, 2016

(54) WINDSHIELD DEVICE FOR SADDLE-RIDE TYPE VEHICLE, AND VEHICLE INCORPORATING SAME

(71) Applicant: HONDA MOTOR CO., LTD., Minato-ku, Tokyo (JP)

(72) Inventors: Naoki Hara, Wako (JP); Hiroo Takemura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/662,281

(22) Filed: Mar. 19, 2015

(65) Prior Publication Data

US 2015/0274234 A1    Oct. 1, 2015

(30) Foreign Application Priority Data

Mar. 26, 2014   (JP) .................. 2014-063649

(51) Int. Cl.
*B62J 17/00* (2006.01)
*B62J 17/04* (2006.01)
(52) U.S. Cl.
CPC ..................... *B62J 17/04* (2013.01)
(58) Field of Classification Search
CPC ........................................................ B62J 17/04
USPC ........................................................ 296/78.1
See application file for complete search history.

(56) References Cited

U.S. PATENT DOCUMENTS 7,812,559 B2    10/2010   Tsuda
2009/0195011 A1*   8/2009   Tsuda ................... B62J 17/04
                                                          296/78.1

FOREIGN PATENT DOCUMENTS

JP            5095250 B2    12/2012

* cited by examiner

*Primary Examiner* — Joseph D Pape
(74) *Attorney, Agent, or Firm* — Carrier Blackman & Associates, P.C.; Joseph P. Carrier; Anne G. Sabourin

(57) ABSTRACT

In a windshield device of a saddle-ride type vehicle, a guide rail is fixed to a vehicle front portion; a moving assembly is movably provided on the guide rail; and a windscreen is supported on the moving assembly. The moving assembly includes a slide member movably attached to the guide rail, a screen supporting member configured to support the windscreen, and a link mechanism arranged between the slide member and the screen supporting member. The link mechanism is configured to increase a movement amount of the screen supporting member to an amount greater than a sliding length of the slide member. Such configuration of the windshield device for the saddle-ride type vehicle reduces the size of a moving mechanism including a moving assembly for the windscreen.

15 Claims, 9 Drawing Sheets

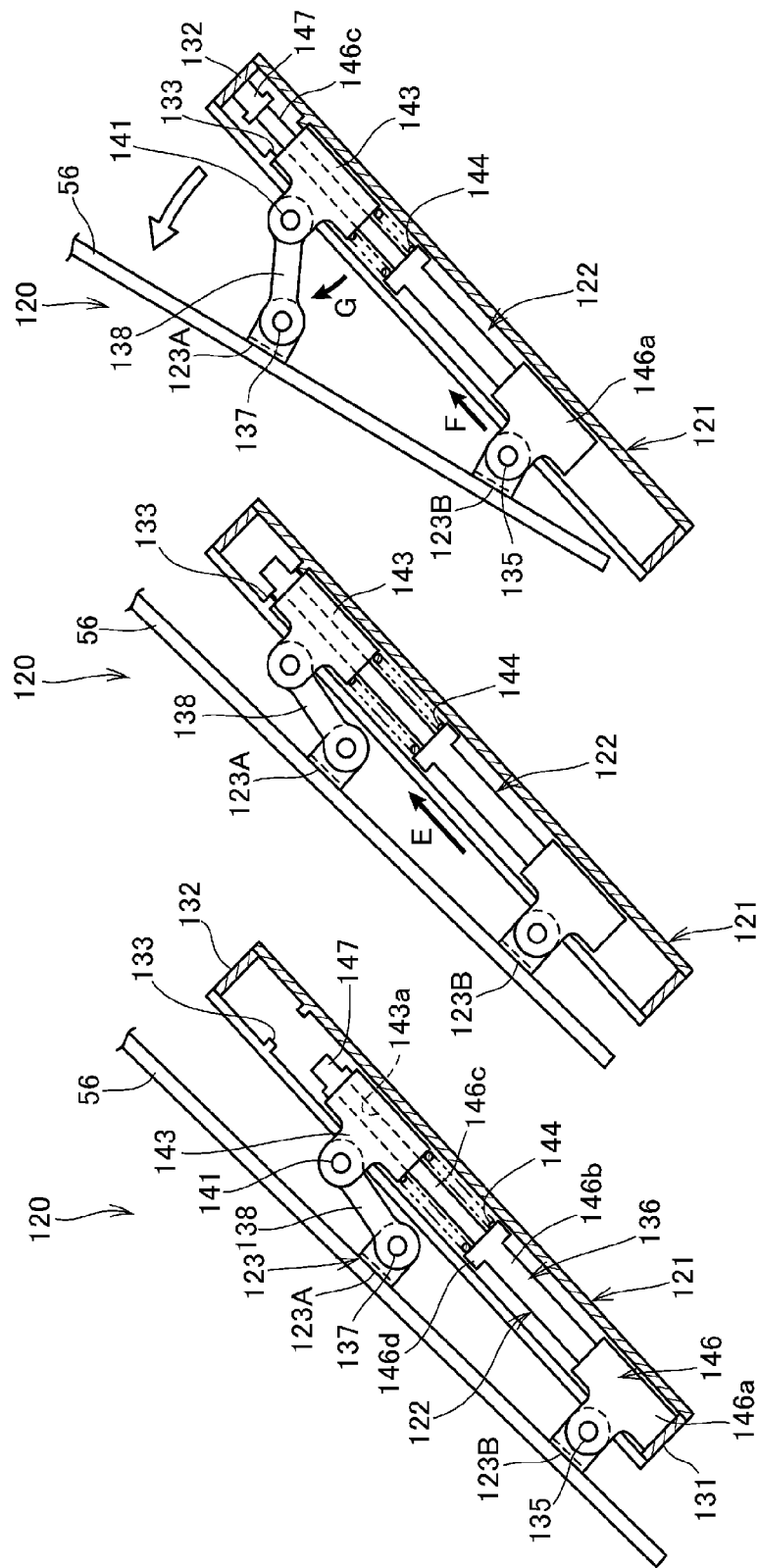

WINDSHIELD DEVICE FOR SADDLE-RIDE TYPE VEHICLE, AND VEHICLE INCORPORATING SAME

CROSS-REFERENCE TO RELATED APPLICATIONS

The present invention claims priority under 35 USC 119 based on Japanese Patent Application No. 2014-063649, filed on Mar. 26, 2014. The entire subject matter of this priority document, including specification claims and drawings thereof, is incorporated by reference herein.

BACKGROUND OF THE INVENTION

1. Field of the Invention

The present invention relates to a windshield device for a saddle-ride type vehicle including a movable windscreen. More particularly, the present invention relates a windshield device having a reduced sized moving mechanism for moving the windscreen, and to saddle-ride type vehicle including the same.

2. Description of the Background Art

There is a known movable windscreen for a saddle-ride type vehicle. A movable windscreen of a saddle-ride type vehicle is supported by movable portions which are attached to be vertically movable along rail-shaped guide portions fixed to a vehicle body. These movable portions can be vertically moved by push cables made to advance and retreat by an electric motor. An example of such movable windscreen is disclosed in the Japanese Patent No. 5095250.

In the Japanese Patent No. 5095250, when the movement amount of the windscreen is to be increased, the movement amounts of the movable portions need to be increased, and the guide portions need to be made longer. Accordingly, the size of a moving mechanism for the windscreen is large.

The present invention is made in view of the above-described background circumstances, and it is one of the objects of the present invention to provide a windshield device for a saddle-ride type vehicle in which the size of a moving mechanism including a moving assembly for a windscreen can be reduced.

SUMMARY OF THE INVENTION

Reference numbers are included in the following description corresponding to the reference numbers used in the drawings. Such reference numbers are provided for purposes of illustration, and are not intended to limit the invention.

In order to achieve the above objects, the present invention according to a first aspect thereof provides a windshield device for a saddle-ride type vehicle in which: a guide rail (82) is fixed to a vehicle front portion; a moving assembly (87) is movably provided on the guide rail (82); and a windscreen (56) is supported on the moving assembly (87). The moving assembly (87) includes a slide member (83) movably attached to the guide rail (82), a screen supporting member (86) configured to support the windscreen (56), and a link mechanism (84), which is configured to increase a movement amount of the screen supporting member (86) to an amount greater than a sliding length of the slide member (83), provided between the slide member (83) and the screen supporting member (86).

The windshield device according to a second aspect thereof, in addition to the first aspect, may be configured such that the guide rail (82) is formed in a linear shape extending upward toward the rear along a vehicle body front portion, and an angle of the screen supporting member (86) and a distance of the screen supporting member (86) in a front-rear direction with respect to the slide member (83) are changed through the link mechanism (84) according to a sliding position of the slide member (83).

Moreover, the windshield device according to a third aspect thereof, in addition to one of the first and second aspects, may be configured such that the link mechanism (84) includes: a first link (91) which is swingably coupled to the slide member (83) and the screen supporting member (86); a second link (92) which is rotatably coupled at one end to a vehicle body; and a third link (93) which has a center of swinging provided in the slide member (83) and which is swingably coupled at one end and another end respectively to the screen supporting member (86) and another end of the second link (92).

Furthermore, the windshield device according to a fourth aspect thereof, in addition to one of the first through third aspects, may be configured such that a pair of the guide rails (82) on left and right sides are provided, and the link mechanism (84) is disposed between the pair of left and right guide rails (82).

Moreover, the windshield device according to a fifth aspect thereof, in addition to one of the third and fourth aspects, may be configured such that a fixing member (101) provided on a vehicle body side to which the second link (92) is coupled is disposed below the guide rail (82) when viewed in a side view.

EFFECTS OF THE INVENTION

According to the first aspect of the present invention, since the moving assembly includes the slide member movably attached to the guide rail and the screen supporting member configured to support the windscreen and the link mechanism configured to increase the movement amount of the screen supporting member to an amount greater than the sliding length of the slide member is provided between the slide member and the screen supporting member, the movement amount of the windshield device can be increased while the length of the guide rail provided on the vehicle body is reduced. Hence, it is possible to reduce the size of the windshield device while facilitating layout of the guide rail.

Moreover, the guide rail is formed in a linear shape extending upward toward the rear along the vehicle body front portion, and the angle of the screen supporting member and the distance of the screen supporting member in the front-rear direction with respect to the slide member are changed through the link mechanism according to the sliding position of the slide member. It may be note that forming the guide rail in a linear shape can reduce the cost. Moreover, the position of the screen, supported by the screen supporting member, in the front-rear direction and an up-down direction can be changed according to the sliding position of the slide member. Furthermore, the distance between a rider and the screen can be made substantially constant, even in a state where the screen is lifted, by changing the angle of the supporting portion. Hence, the visibility of the rider can be maintained in an excellent state.

Furthermore, the link mechanism includes: the first link which is swingably coupled to the slide member and the screen supporting member; the second link which is swingably coupled at the one end to the vehicle body; and the third link which has the center of swinging provided in the slide member and which is swingably coupled at the one end and the other end thereof to the screen supporting member and the other end of the second link, respectively. Since the third link swings about a coupling portion between the second link and the third link when the slide member is moved, the movement amount of the screen supporting member can be made greater than that of the slide member in a simple configuration. Moreover, the weight of the vehicle front portion can be reduced by making the configuration of the link mechanism simple.

Moreover, since the pair of guide rails on left and right sides are provided and the link mechanism is disposed between the pair of left and right guide rails, it is possible to prevent an increase in the size of the slide structure and also protect the link mechanism with the guide rails.

Furthermore, since the fixing member on the vehicle body side to which the second link is coupled is disposed below the guide rail when viewed in the side view, it is possible to prevent tampering and also achieve excellent external appearance by disposing the fixing member at a position hidden by the guide rail.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIGS. 9A-9C are cross-sectional views showing an operation of the windshield device, where FIG. 9A is a cross-sectional view showing a state where a windscreen is at the lowest position, FIG. 9B is a cross-sectional view showing a state where the windscreen is being lifted, and FIG. 9C is a cross-sectional view showing a state where the windscreen is at the highest position.

DETAILED DESCRIPTION OF ILLUSTRATIVE EMBODIMENTS

Figure 1:
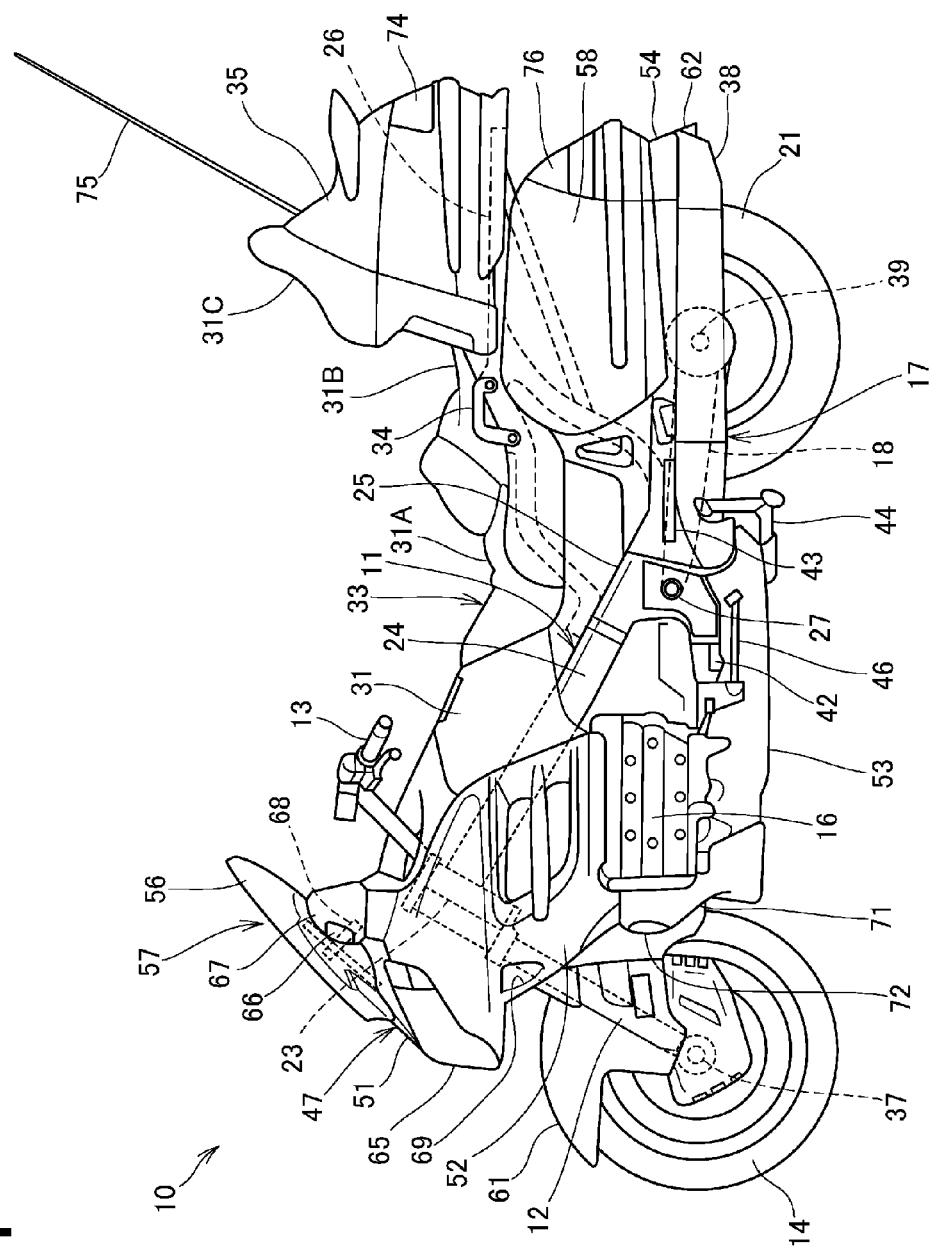
FIG. 1 is a left-side view showing a motorcycle including a windshield device according to a first illustrative embodiment of the present invention.

Illustrative embodiments of the present invention are described hereinafter in detail with reference to the accompanying drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

In other words, the descriptions on directions such as front, rear, left, right, up, and down in the explanation are the same as directions with respect to a vehicle body unless otherwise noted. Moreover, reference sign FR shown in the drawings indicates a vehicle-body front side, reference sign UP indicates a vehicle-body upper side, and reference sign LE indicates a vehicle-body left side.

First Embodiment

FIG. 1 is a left-side view showing a motorcycle 10 including a windshield device 57 of a first illustrative embodiment of the present invention.

The motorcycle 10 includes a vehicle-body frame 11, a front fork 12, a handle bar 13, a front wheel 14, an engine 16, an exhaust device 17, a rear fork 18, and a rear wheel 21.

The vehicle-body frame 11 includes a head pipe 23, paired left and right main frames 24, paired left and right pivot plates 25, and paired left and right seat rails 26.

The head pipe 23 is disposed in a front end portion of the vehicle-body frame 11 and supports the front fork 12 in such a way that the front fork 12 is steerable. The main frames 24 extend obliquely downward from the head pipe 23 toward a rear left side and a rear right side. The engine 16 is supported by lower portions of the main frames 24, and a fuel tank 31 is supported by upper portions of the main frames 24. The pivot plates 25 are connected to rear portions of the main frames 24. The seat rails 26 extend obliquely upward toward the rear from front portions and rear portions of the pivot plates 25. A seat 33 is supported by front portions of the seat rails 26, and grab rails 34 and a trunk box 35 are supported by rear portions of the seat rails 26.

The handle bar 13 is attached to an upper portion of the front fork 12. The front wheel 14 is supported by a lower portion of the front fork 12 via an axle 37. The exhaust device 17 includes exhaust pipes (not illustrated) extending from the engine 16 and mufflers 38 attached to rear ends of the exhaust pipes. The rear fork 18 is supported by a pivot shaft 27 provided in the pivot plates 25 to be vertically swingable, and supports the rear wheel 21 with an axle 39 provided in a rear end portion of the rear fork 18. A rear cushion unit (not illustrated) is provided between the rear end portion of the rear fork 18 and the vehicle-body frame 11.

The seat 33 is disposed behind the fuel tank 31 and includes a driver seat 31A on which a driver seats, a passenger seat 31B on which a passenger seats and which is formed behind the driver seat 31A to be one step higher than the driver seat 31A, and a backrest portion 31C for the passenger. Moreover, paired left and right driver steps 42 on which the driver places his/her feet and paired left and right passenger steps 43 on which the passenger places his/her feet are attached to the pivot plates 25 of the vehicle-body frame 11. Furthermore, a main stand 44, a side stand 46, and a vehicle-body cover 47 are attached to the vehicle-body frame 11.

The vehicle-body cover 47 includes a front cowl 51 covering a vehicle-body front portion, paired left and right side cowls 52 covering vehicle-body side portions, an under cowl 53 covering a vehicle-body lower portion, and a rear cowl 54 covering a vehicle-body rear portion.

The front cowl 51 is provided with the windshield device 57 configured to automatically move a windscreen 56 up and down. Paired left and right side bags 58 are formed integrally in the rear cowl 54. Moreover, a front fender 61 covering the front wheel 14 from above is attached to the front fork 12, and a rear fender 62 covering the rear wheel 21 from above is attached to the rear cowl 54.

A headlight 65 is provided on a front face of the front cowl 51, the windscreen 56 is provided in an upper portion of the front cowl 51, and paired left and right mirrors 67 with built-in front turn signals 66 are provided at left and right ends of the front cowl 51. A meter 68 is disposed inside the front cowl 51.

Paired left and right air openings 69 for supplying outside air from the front of the vehicle to a vicinity of the engine 16 are provided in the side cowls 52. Moreover, paired left and right engine guards 71 are provided in front of the left and right portions of the engine 16, and fog lamps 72 are attached to the respective engine guards 71.

Paired left and right tail lamp units 74 are provided on a back face of the trunk box 35, and a rod antenna 75 used by an audio unit to receive radio broadcast is provided in a right portion of the trunk box 35. Rear turn signals 76 are disposed on back faces of the side bags 58.

Figure 2:
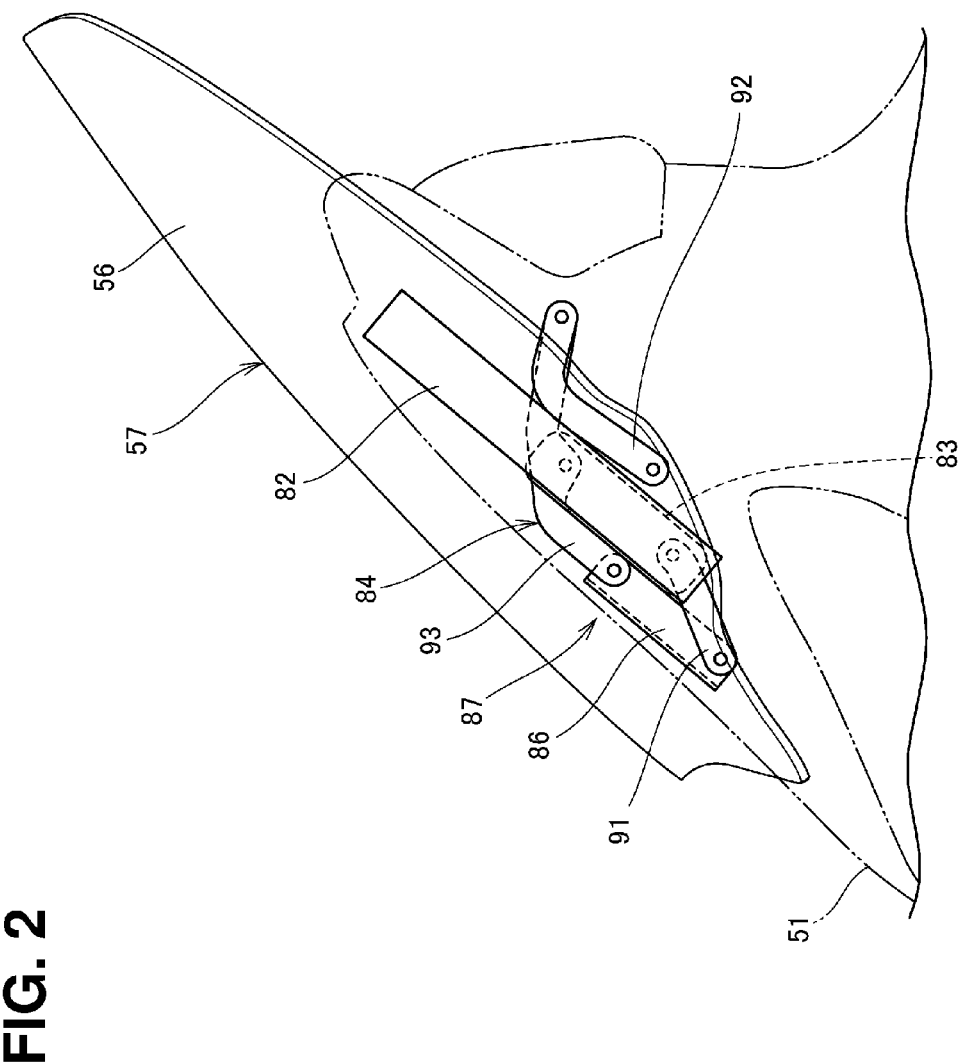
FIG. 2 is a left-side view of a vehicle-body front portion showing the windshield device.

FIG. 2 is a left-side view of the vehicle-body front portion which shows the windshield device 57.

Figure 3:
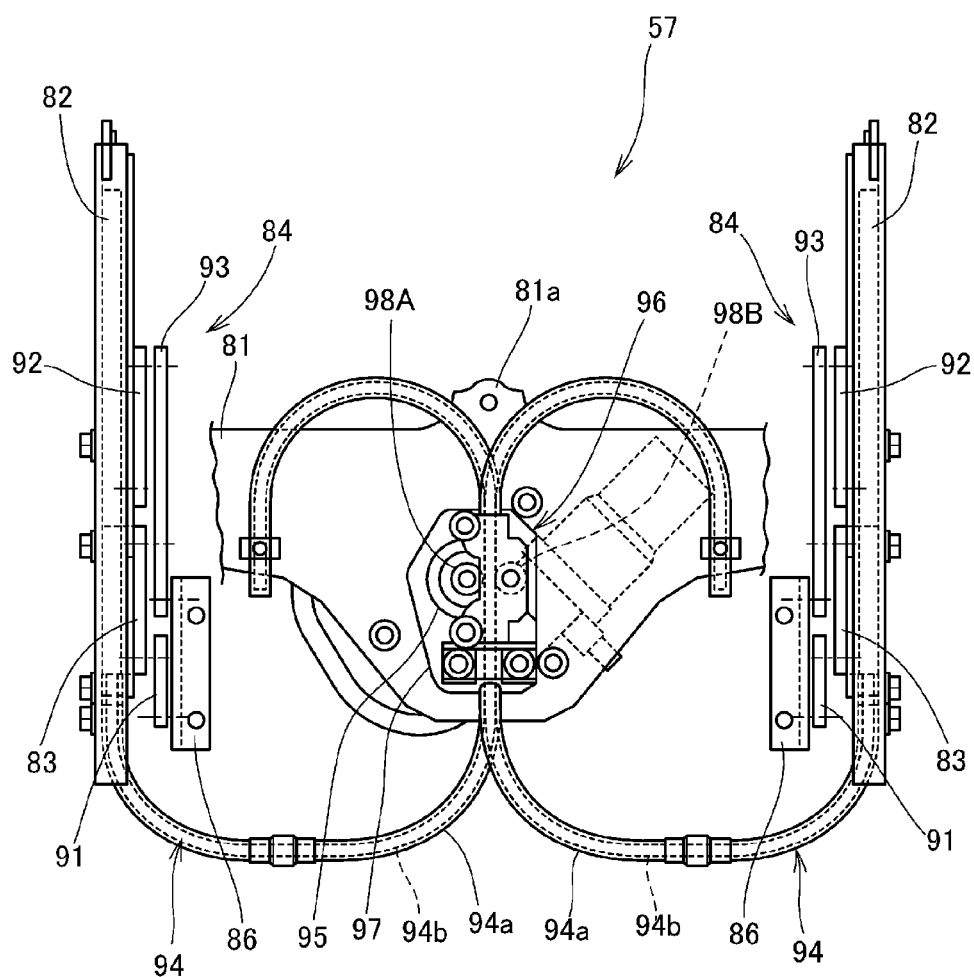
FIG. 3 is a front view showing the windshield device.

The windshield device 57 includes a supporting member 81 provided on the front cowl 51 side, paired left and right guide rails 82, paired left and right slide members 83, paired left and right link mechanisms 84, paired left and right screen supporting members 86, and the windscreen 56 (refer to FIG. 3 for the configuration of the windshield device 57 except for the windscreen 56).

The guide rails 82 are attached to the supporting members attached to a front upper portion of the front cowl 51 to extend linearly upward toward the rear at the same inclination as the windscreen 56. The slide members 83 are movably attached respectively to the left and right guide rails 82. The paired left and right screen supporting members 86 are fixed to a lower portion of a back face of the windscreen 56.

Each of the link mechanisms 84 is formed of a first link 91, a second link 92, and a third link 93.

The first link 91 is swingably coupled to a lower end portion of the slide member 83, and also to a lower end portion of the screen supporting member 86. One end portion of the second link 92 is swingably coupled to the supporting member 81. One end portion of the third link 93 is swingably coupled to the other end of the second link 92, an intermediate portion of the third link 93 is swingably coupled to an upper end portion of the slide member 83, and the other end portion of the third link 93 is swingably coupled to an upper end portion of the screen supporting member 86.

The slide member 83, the link mechanism 84, and the screen supporting member 86 which are described above form a moving assembly 87 (also referred to as a movable body 87) configured to move or swing with the movement of the windscreen 56.

FIG. 3 is a front view showing the windshield device 57.

The supporting member 81 is attached to an inner side of the front cowl 51 (see FIG. 2) by screws and the like via multiple attachment portions 81a. The guide rails 82, 82 are supported respectively in left and right end portions of the supporting member 81 to be parallel to each other.

The slide members 83 are movably supported on inner surfaces of the guide rails 82. One ends of push cables 94 are coupled to lower end portions of the slide members 83. The push cables 94 curve from the one ends thereof toward the center side in the vehicle width direction, then curve upward to penetrate a cable drive mechanism 96 provided in a center portion of the supporting member 81 in the vehicle width direction, and then curve outward in the vehicle width direction such that the other ends of the push cables 94 are fixed to left and right portions of the cable drive mechanism 96 in the supporting member 81.

The cable drive mechanism 96 includes a case 97 which is fixed to the supporting member 81 and in which the push cables 94 pass, paired rollers 98A, 98B which are rotatably supported by the case 97, and an electric motor 95 which is attached to the supporting member 81 or the case 97 to drive the roller 98A. The roller 98A is attached to a rotary shaft of the electric motor 95.

Each of the push cables 94 is formed of an outer cable 94a and an inner wire 94b movably inserted into the outer cable 94a. One end of the outer cable 94a is fixed to the guide rail 82 and the other end is fixed to the supporting member 81. One end of the inner wire 94b is coupled to the slide member 83, an intermediate portion is interposed between the paired rollers 98A, 98B, and the other end is a free end in the outer cable 94a.

The push cables 94 and the cable drive mechanism 96 which are described above form part of the windshield device 57.

When the electric motor 95 is activated and the roller 98A is rotated, the inner wires 94b interposed and held between the paired rollers 98A, 98B are pushed out, and the slide members 83 are moved upward together with the inner wires 94b. Meanwhile, when the roller 98A is rotated in a reverse direction by the electric motor 95, the inner wires 94b are pulled back, and the slide members 83 are moved downward.

Figure 4:
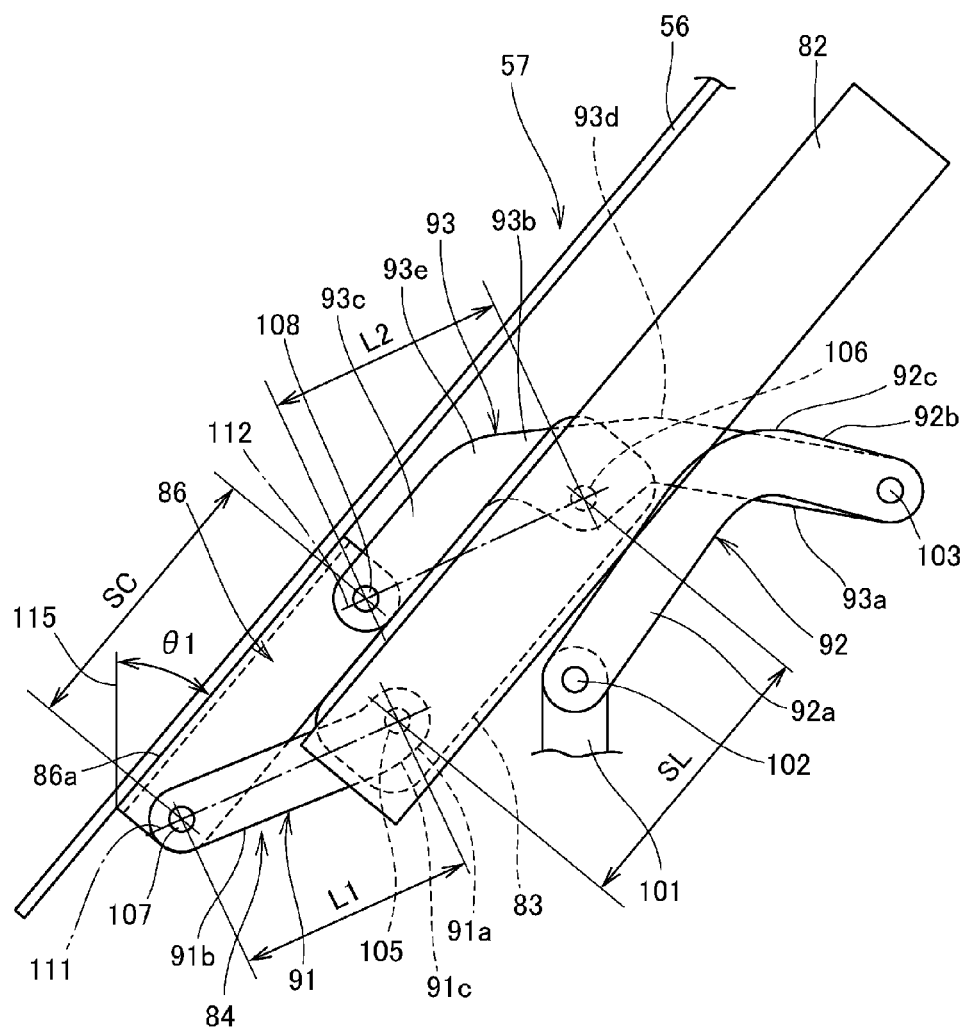
FIG. 4 is a left-side view showing a main portion of the windshield device.

FIG. 4 is a left-side view showing a main portion of the windshield device 57.

The slide member 83 is located at the lower end portion of the guide rail 82, and the windscreen 56 is in a state disposed at the lowest position.

The supporting member 81 (see FIG. 3) is provided with a link supporting portion 101, and the one end portion of the second link 92 is swingably supported by the link supporting portion 101 via a supporting shaft 102. The one end portion of the third link 93 is swingably coupled to the other end portion of the second link 92 via a supporting shaft 103.

A slide-side lower supporting shaft 105 is provided in the lower end portion of the slide member 83, and a slide-side upper supporting shaft 106 is provided in the upper end portion of the slide member 83. The one end portion of the first link 91 is swingably supported by the slide-side lower supporting shaft 105, and the intermediate portion of the third link 93 is swingably supported by the slide-side upper supporting shaft 106.

A screen-side lower supporting shaft 107 is provided in the lower end portion of the screen supporting member 86, and a screen-side upper supporting shaft 108 is provided in the upper end portion of the screen supporting member 86. The other end portion of the first link 91 is swingably supported by the screen-side lower supporting shaft 107, and the other end portion of the third link 93 is swingably supported by the screen-side upper supporting shaft 108.

The first link 91 integrally includes an end portion 91a, a linear portion 91b, and a bent portion 91c connecting the end portion 91a and the linear portion 91b to each other and bent to protrude downward. The first link 91 is inclined downward toward the front as a whole.

The second link 92 integrally includes two linear portions 92a, 92b and a bent portion 92c connecting the linear portions 92a, 92b to each other and bent to protrude upward.

The third link 93 integrally includes three linear portions 93a, 93b, 93c, a bent portion 93d connecting the linear portions 93a, 93b to each other and bent to protrude upward, and a bent portion 93e connecting the linear portions 93b, 93c to each other and bent to protrude upward. The linear portion 93b is supported by the slide-side upper supporting shaft 106, and the third link 93 extends substantially-horizontally as a whole.

The distance between the slide-side lower supporting shaft 105 and the screen-side lower supporting shaft 107 is referred to as L1, and the distance between the slide-side upper supporting shaft 106 and the screen-side upper supporting shaft 108 is referred to as L2. Moreover, the distance between the slide-side lower supporting shaft 105 and the slide-side upper supporting shaft 106 is referred to as SL, and the distance between the screen-side lower supporting shaft 107 and the screen-side upper supporting shaft 108 is referred to as SC.

Here, the distance L1 and the distance L2 are equal to each other (L1=L2), and the distance SL and the distance SC are equal to each other (SL=SC). In other words, there is formed a parallel link mechanism in which a straight line 111 passing through the slide-side lower supporting shaft 105 and the screen-side lower supporting shaft 107 and a straight line 112 passing through the slide-side upper supporting shaft 106 and the screen-side upper supporting shaft 108 are parallel to each other. Note that reference sign θ1 denotes an inclination angle of a front face 86a of the screen supporting member 86 with respect to a vertical line 115, i.e. an inclination angle of the wind screen 56 near the screen supporting member 86.

Next, an operation of the aforementioned windshield device 57 is described.

Figure 5:
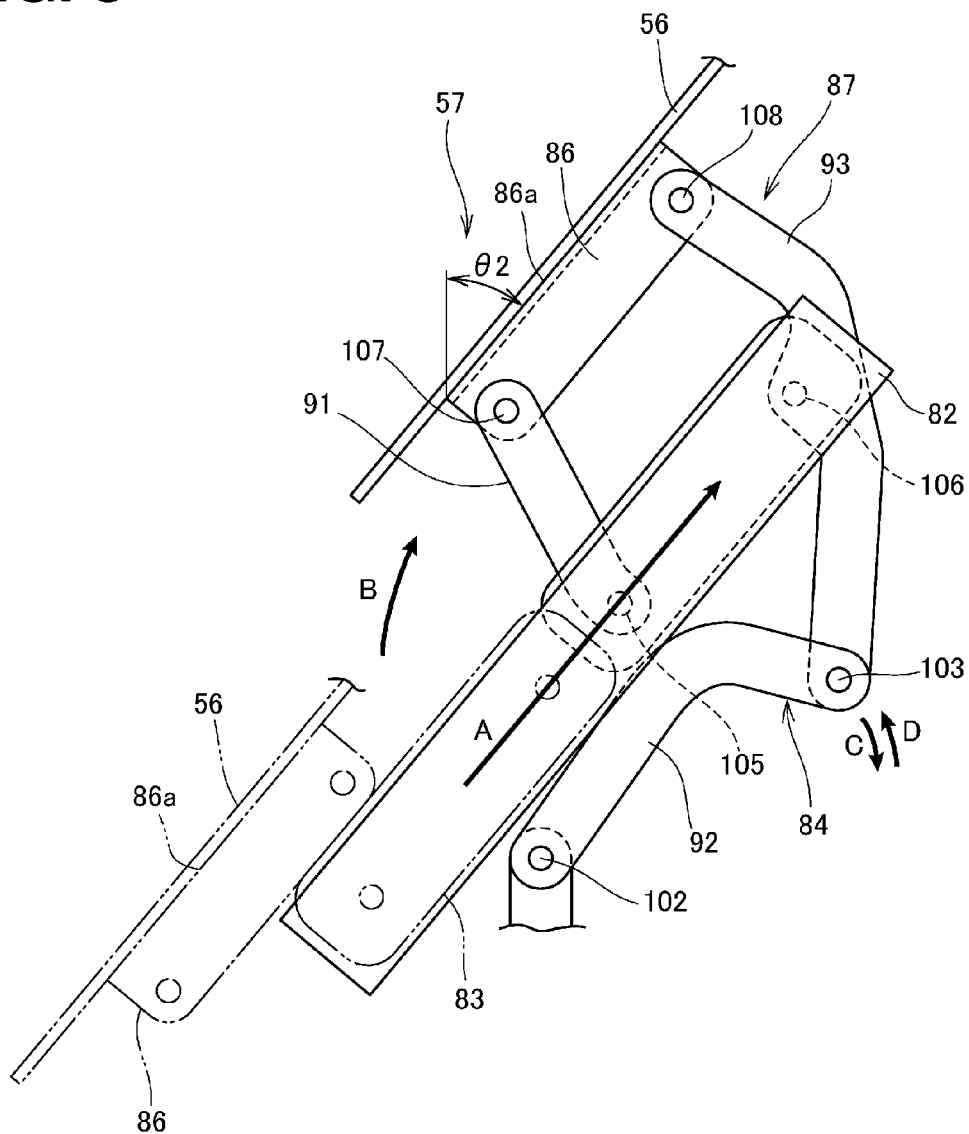
FIG. 5 is a first operation diagram showing an operation of the windshield device.

FIG. 5 is a first operation diagram showing an operation of the windshield device 57, and shows a state where the windscreen 56 is lifted and disposed at the highest position. It may be noted that the windscreen 56, the slide member 83, and the screen supporting member 86 at the lowest positions shown in FIG. 4 are illustrated by imaginary lines.

As shown by the arrow A, the slide member 83 is linearly lifted from the lower end side to the upper end side of the guide rail 82 along the guide rail 82. With this lifting, as shown by the arrow B, the windscreen 56 and the screen supporting member 86 are lifted in a substantially-arc shaped manner from a position near the lower end portion of the guide rail 82 to a position away from and in front of the upper end portion of the guide rail 82.

Since the distance L1 and the distance L2 are equal to each other and the distance SL and the distance SC are equal to each other as shown in FIG. 4, an inclination angle θ2 of the front face 86a of the screen supporting member 86 with respect to a vertical line 116 is equal to the inclination angle θ1 (see FIG. 4) in FIG. 5. The inclination angle of the front face 86a of the screen supporting member 86 is always constant as described above.

Moreover, swinging of the third link 93 coupled to the slide member 83 about the slide-side upper supporting shaft 106 with the lifting of the slide member 83 causes the second link 92 to swing about the supporting shaft 102. Accordingly, the supporting shaft 103 which is a coupling portion between the second link 92 and the third link 93 first swings in the direction of the arrow C, and then swings in the direction of the arrow D, i.e. the opposite direction to the arrow C.

Figure 6:
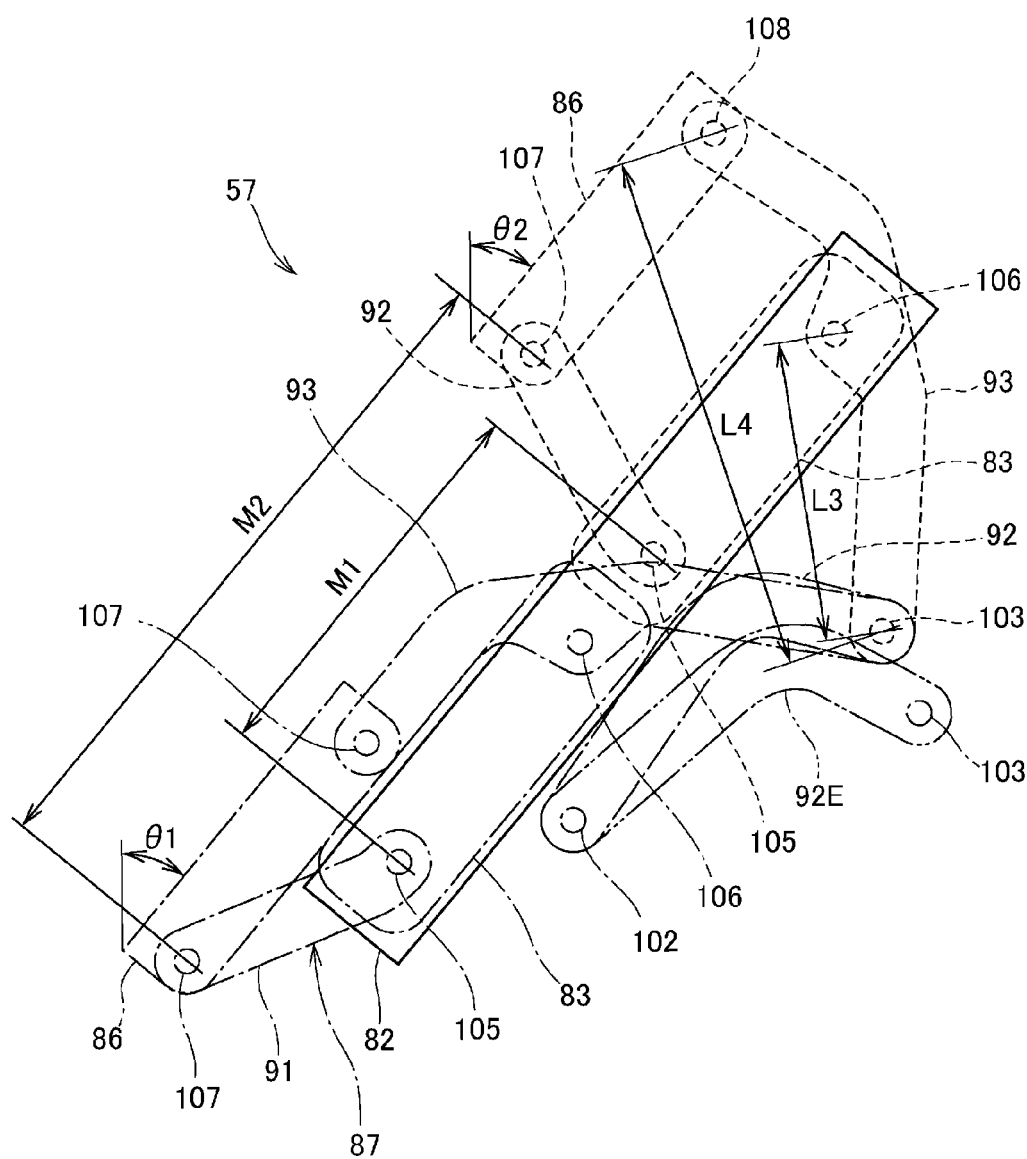
FIG. 6 is a second operation diagram showing the operation of the windshield device.

FIG. 6 is a second operation diagram showing the operation of the windshield device 57, and shows a state before the lifting of the slide member 83 and a state after the lifting of the slide member 83. The parts before the lifting are illustrated by one-dot dash line, and the parts after the lifting are illustrated by broken lines.

A relationship of M2>M1 is satisfied, where M1 is a movement amount of the slide member 83, and M2 is a movement amount of the screen-side lower supporting shaft 107 along the guide rail 82 which is given as a representative of a movement amount of the screen supporting member 86. In this case, the movement amount M2 is about 1.7 times the movement amount M1.

The movement amount M2 of the screen supporting member 86 can be made greater than the movement amount M1 of the slide member 83 as described above mainly due to the third link 93.

The third link 93 swings about the supporting shaft 103 on the one end side. The slide member 83 is coupled to the intermediate portion of the third link 93 via the slide-side upper supporting shaft 106, and the screen supporting member 86 is coupled to the other end portion of the third link 93 via the screen-side upper supporting shaft 108.

A relationship of L4>L3 is satisfied, where L3 is a distance from the supporting shaft 103 to the slide-side upper supporting shaft 106 in the third link 93 and L4 is a distance from the supporting shaft 103 to the screen-side upper supporting shaft 108. The distance L4 is about 1.7 times the distance L3.

Accordingly, the screen-side upper supporting shaft 108 spaced away greatly from the supporting shaft 103 swings by a greater amount than the slide-side upper supporting shaft 106 close to the supporting shaft 103. Hence, the screen supporting member 86 moves by a greater amount than the slide member 83.

For example, the ratio between the movement amounts of the slide member 83 and the screen supporting member 86 can be changed by changing the ratio between the distance from the supporting shaft 103 to the slide-side upper supporting shaft 106 and the distance from the supporting shaft 103 to the screen-side upper supporting shaft 108.

The position of the supporting shaft 103 changes when the third link 93 swings, and the second link 92 absorbs this position change. Reference numeral 92E in the drawing is the second link in the case where the second link 92 swings farthest in the direction away from the guide rail 82.

The inclination angle θ2 of the lifted screen supporting member 86 is equal to the inclination angle θ1 before the lifting. However, for example, the inclination angle θ2 can be made greater or smaller than the inclination angle θ1 by adjusting the positions of the slide-side lower supporting shaft 105, the slide-side upper supporting shaft 106, the screen-side lower supporting shaft 107, and the screen-side upper supporting shaft 108. Moreover, even when the windscreen 56 is moved up and down, the distance between the rider and the windscreen 56 can be made substantially constant by changing the angle of the windscreen 56.

In other words, the inclination angle of the screen supporting member 86 and the movement distance of the screen supporting member 86 in a front-rear direction and an up-down-direction with respect to the slide member 83 can be changed through the link mechanism 84 according to the sliding position of the slide member 83.

Figure 7:
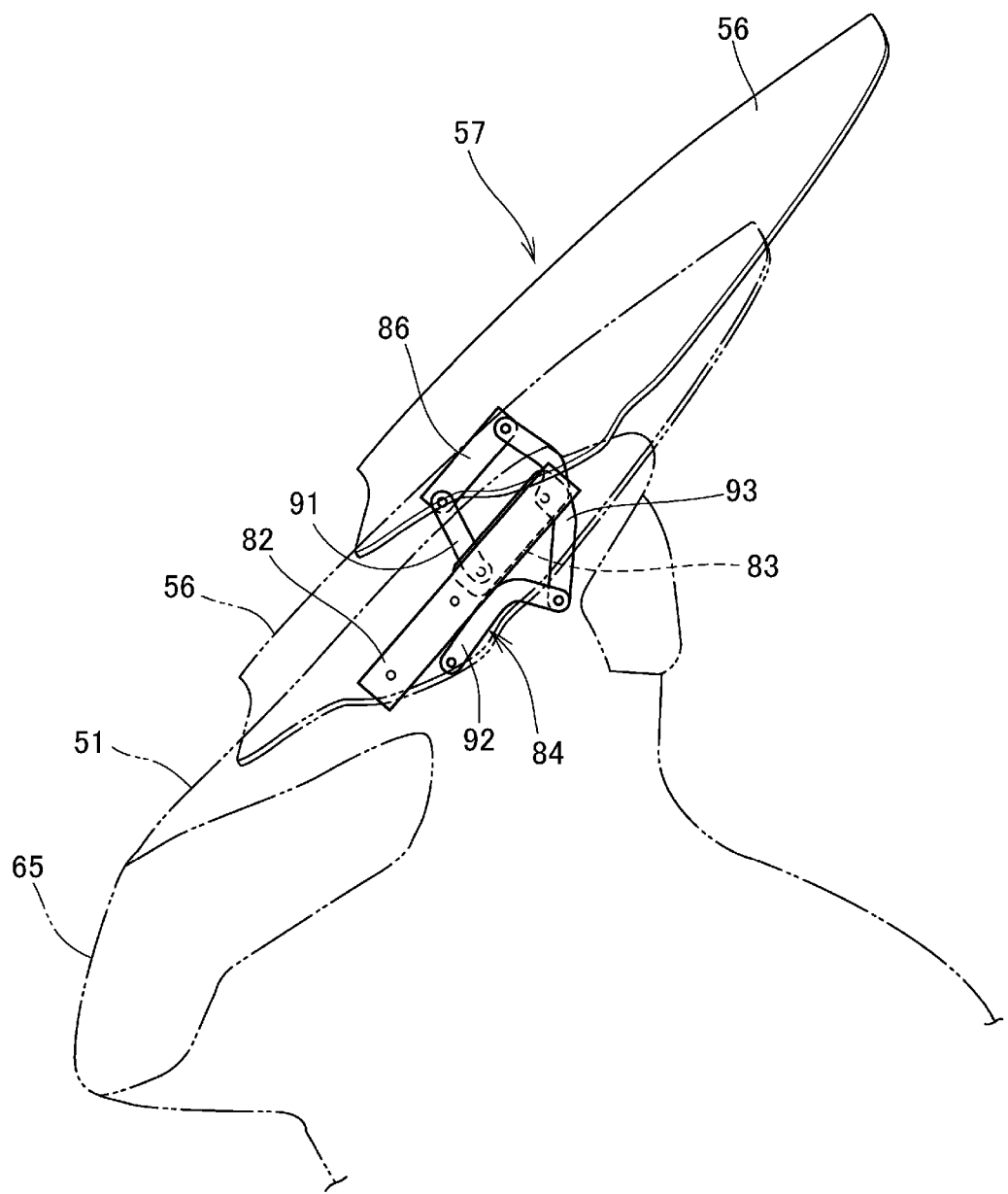
FIG. 7 is a left-side view showing the vehicle-body front portion in which a windscreen is lifted to the highest position.

FIG. 7 is a left-side view showing the vehicle-body front portion in the case where the windscreen 56 is lifted to the highest position.

The windscreen 56 is in a state moved parallel from the windscreen 56 at the lowest position which is shown by imaginary lines, to the highest position.

For example, traveling wind hitting the driver can be adjusted by lifting or lowering the windscreen 56 depending on the vehicle speed at which the motorcycle 10 is traveling.

Moreover, the height of the windscreen 56 can be also adjusted depending on the physique (height, seated height, and the like) of the driver riding on the motorcycle 10.

In the windshield device 57 of the embodiment, since the windscreen 56 is moved obliquely upward and rearward, the windscreen 56 comes closer to the driver as the windscreen 56 is lifted higher.

Accordingly, in a case where a predetermined distance is desired to be maintained between the windscreen 56 and the driver when the windscreen 56 is lifted, the lengths of the links in the link mechanism 84 and the coupling positions of the links to the slide member 83 and the screen supporting member 86 may be changed as described above. This can prevent the windscreen 56 from giving a feeling of tightness to the driver. Moreover, the windscreen 56 can be brought closer to the driver.

As shown in FIGS. 1-4 and as described above, in the windshield device 57 of the motorcycle 10 being a saddle-ride type vehicle in which: the guide rails 82 are fixed to the vehicle front portion; the movable bodies 87 are movably provided on the guide rails 82; and the windscreen 56 is supported on the movable bodies 87, each of the movable bodies 87 includes the slide member 83 movably attached to the guide rail 82 and the screen supporting member 86 being a supporting portion configured to support the windscreen 56, and the link mechanism 84 configured to increase the movement amount of the screen supporting member 86 to an amount greater than the sliding length of the slide member 83 is provided between the slide member 83 and the screen supporting member 86.

According to such configuration, the movement amount of the windshield device 57 can be increased while the lengths of the guide rails 82 provided on the vehicle body are reduced. Hence, it is possible to reduce the size of the windshield device 57 while facilitating layout of the guide rails 82.

Moreover, as shown in FIG. 6, the guide rail 82 is formed in a linear shape extending upward toward the rear along the vehicle-body front portion, and the angle of the screen supporting member 86 and the distance of the screen supporting member 86 in the front-rear direction with respect to the slide member 83 are changed through the link mechanism 84 according to the sliding position of the slide member 83.

Since the guide rail 82 has a linear shape, no bending is required and the cost can be reduced. Moreover, the position of the windscreen 56, supported by the screen supporting member 86, in the front-rear direction and the up-down direction can be changed according to the sliding position of the slide member 83. Furthermore, the distance between the rider and the windscreen 56 can be made substantially constant, even in a state where the windscreen 56 is lifted, by changing the angle of the windscreen 56. Hence, the visibility of the rider can be maintained in an excellent state.

Moreover, as shown in FIG. 4, the link mechanism 84 includes: the first link 91 which is swingably coupled to the slide member 83 and the screen supporting member 86; the second link 92 which is swingably coupled at the one end to the vehicle body; and the third link 93 which has the center of swinging provided in the slide member 83 and which is swingably coupled at the one end and the other end respectively to the screen supporting member 86 and the other end of the second link 92. Accordingly, the movement amount of the screen supporting member 86 can be made greater than that of the slide member 83 in a simple configuration by causing the third link 93 to swing about the coupling portion between the second link 92 and the third link 93 when the slide member 83 is moved. Moreover, the weight of the vehicle front portion can be reduced by making the configuration of the link mechanism 84 simple.

Furthermore, as shown in FIGS. 3-4, since the pair of guide rails 82 on left and right sides are provided, and the link mechanisms 84 are disposed between the pair of left and right guide rails 82, it is possible to prevent an increase in the size of the slide structure and also protect the link mechanisms 84 with the guide rails 82.

Moreover, as shown in FIG. 4, since the link supporting portion 101 being a fixing member on the vehicle body side to which the second link 92 is coupled is disposed below the guide rail 82 in a side view, it is possible to prevent tampering and also achieve excellent external appearance by disposing the link supporting portion 101 at a position hidden by the guide rail 82.

Second Embodiment

Figure 8:
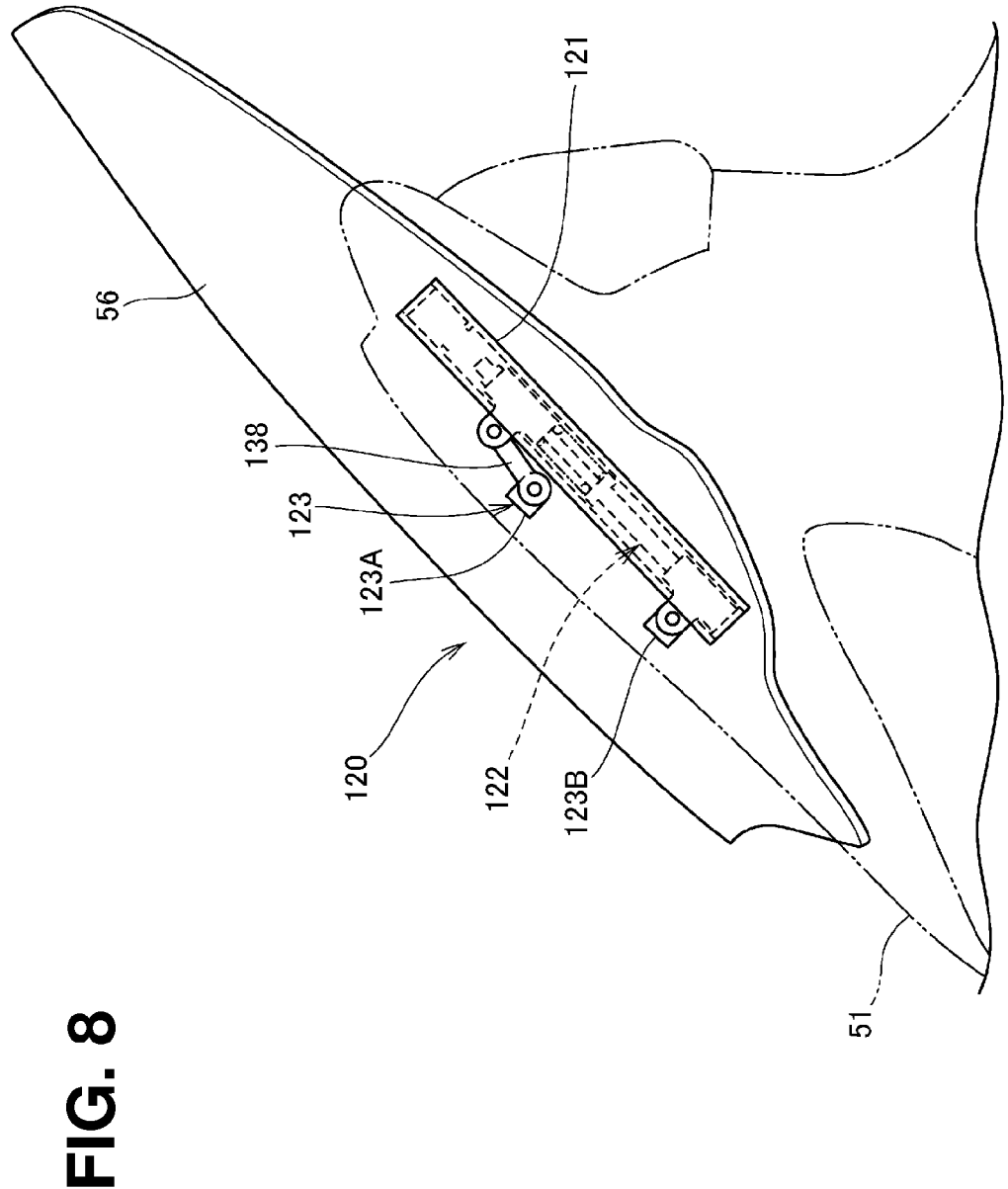
FIG. 8 is a left-side view of a vehicle-body front portion showing a windshield device according to a second illustrative embodiment of the present invention.

FIG. 8 is a left-side view of a vehicle-body front portion which shows a windshield device 120 of a second embodiment. The same configurations as those in the first embodiment shown in FIG. 2 are denoted by the same reference numerals, and detailed description thereof is omitted.

The windshield device 120 is attached to a front upper portion of a front cowl 51 forming part of a vehicle-body cover.

The windshield device 120 includes paired left and right guide rails 121, paired left and right slide members 122, paired left and right screen supporting members 123, and a windscreen 56.

The paired left and right guide rails 121 are provided on an inner side of the front cowl 51 substantially along a front face of the front cowl 51 to extend upward toward the rear. The slide members 122 are movably provided respectively on the inner sides of the guide rails 121. The screen supporting members 123 are formed of paired left and right upper supporting portions 123A and paired left and right lower supporting portions 123B which are vertically arranged. Lower portions of the upper supporting portions 123A and the lower supporting portions 123B are swingably attached to the slide members 122, and the windscreen 56 is attached to upper portions of the upper supporting portions 123A and the lower supporting portions 123B.

FIGS. 9A-9C are cross-sectional views showing an operation of the windshield device 120. FIG. 9A is a cross-sectional view showing a state where the windscreen 56 is at the lowest position. FIG. 9B is a cross-sectional view showing a state where the windscreen 56 is being lifted. FIG. 9C is a cross-sectional view showing a state where the windscreen 56 is at the highest position.

As shown in FIG. 9A, the windshield device 120 includes a supporting member 81 (see FIG. 3) provided on the front cowl 51 (see FIG. 2) side, the paired left and right guide rails 121, the paired left and right slide members 122, the paired left and right screen supporting members 123, the windscreen 56, push cables 94 (see FIG. 3), and a cable drive mechanism 96 (see FIG. 3).

Each of the guide rails 121 includes a lower stopper portion 131 and an upper stopper portion 132 provided at both ends of the guide rail 121 and an intermediate stopper portion 133 provided close to the upper end of the guide rail 121.

Each of the slide members 122 includes a lower slide member 136, an upper link 138, an upper slide member 143, and a compression coil spring 144.

The lower slide member 136 is an elongated member swingably coupled to the lower supporting portion 123B of the screen supporting member 123 via a supporting shaft 135. One end of the upper link 138 is swingably coupled to the upper supporting portion 123A of the screen supporting member 123 via a supporting shaft 137. The upper slide member 143 is swingably coupled to the other end of the upper link 138 via the supporting shaft 141 and is slidably attached to the lower slide member 136. The compression coil spring 144 is provided between the lower slide member 136 and the upper slide member 143 and biases the upper slide member 143 toward an upper end of the lower slide member 136 relative to the lower slide member 136.

An end portion of an outer cable 94a (see FIG. 3) of the push cable 94 is connected to the guide rail 121, and an end portion of an inner wire 94b (see FIG. 3) of the push cable 94 is connected to part of the slide member 122, for example, the lower slide member 136.

The lower slide member 136 is formed of a lower slide rod portion 146 and a rod end portion 147 attached to an upper end portion of the lower slide rod portion 146 to position the upper slide member 143. The lower slide rod portion 146 integrally includes a lower slide base portion 146a coupled to the supporting shaft 135, a rod extending portion 146b extending integrally from the lower slide base portion 146a along the guide rail 121, and a shaft portion 146c extending from a front end portion of the rod extending portion 146b and having a front end to which the rod end portion 147 is attached.

One end of the lower slide base portion 146a abuts on the lower stopper portion 131 of the guide rail 121. The rod extending portion 146b includes a rod flange portion 146d. The upper slide member 143 is movably fitted to the shaft portion 146c, and the compression coil spring 144 whose both ends are supported by the rod flange portion 146d and the upper slide member 143 is fitted to the shaft portion 146c. The upper slide member 143 is thus pushed against the rod end portion 147 by elastic force of the compression coil spring 144.

An shaft insertion hole 143a into which the shaft portion 146c of the lower slide member 136 is inserted is opened in the upper slide member 143.

When the electric motor 95 shown in FIG. 3 is activated and the inner wire 94b is pushed out, as shown in FIG. 9B, the lower slide member 136 and the upper slide member 143 are integrally moved upward along the guide rail 121 as shown by the arrow E.

Then, when one end surface of the upper slide member 143 abuts on the intermediate stopper portion 133, in FIG. 9C, the movement of the upper slide member 143 stops while the movement of the lower slide member 136 continues against the biasing force of the compression coil spring 144 as shown by the arrow F. Due to this, the distance between the supporting shafts 135, 141 is reduced, and the upper link 138 swings about the supporting shaft 141 as shown by the arrow G. As a result, the windscreen 56 swings as shown by the white arrow, i.e. the inclination angle of the windscreen 56 becomes steeper and the windscreen 56 is set to an upright state.

Then, when the rod end portion 147 of the lower slide member 136 abuts on the upper stopper portion 132, the movement of the lower slide member 136 is stopped and the lifting and swinging of the windscreen 56 is stopped.

Meanwhile, when a rotary shaft of the electric motor 95 is rotated in a reverse direction, the windscreen 56 is lowered and the inclined angle thereof becomes gradual, opposite to the above description.

As described above, the windshield device 120 can move the windscreen 56 up and down and also change the inclination angle of the windscreen 56.

The aforementioned embodiments merely show some modes of the present invention, and various modifications and applications can be made within a scope not departing from the spirit of the present invention.

For example, although the lower supporting portion 123B is coupled to the lower slide base portion 146a and the upper supporting portion 123A is coupled to the upper slide member 143 via the upper link 138 in the aforementioned embodiment as shown in FIG. 9A, the present invention is not limited to this. The lower supporting portion 123B may be swingably coupled to the lower slide base portion 146a via a link, and the upper supporting portion 123A may be directly and swingably coupled to the upper slide member 143.

The present invention is not limited to be applied to the motorcycle 10 and can be applied to saddle-ride type vehicles other than the motorcycle 10. It may be noted that the saddle-ride type vehicles include all vehicles on which a rider rides by straddling on a vehicle body, and include not only motorcycles (including motorized bicycles) but also tricycles and four-wheel vehicles categorized into ATV (all-terrain vehicle).

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

EXPLANATION OF THE REFERENCE NUMERALS

10 MOTORCYCLE (SADDLE-RIDE TYPE VEHICLE)
56 WINDSCREEN
57 WINDSHIELD DEVICE
82 GUIDE RAIL
83 SLIDE MEMBER
84 LINK MECHANISM
86 SCREEN SUPPORTING MEMBER (SUPPORTING PORTION)
87 MOVING ASSEMBLY
101 LINK SUPPORTING PORTION (FIXING MEMBER)

What is claimed is:

1. A windshield device for a saddle-ride type vehicle, said windshield device comprising a guide rail fixed to a vehicle front portion; a moving assembly movably provided on the guide rail; and a windscreen supported on the moving assembly; wherein the moving assembly comprise a slide member movably attached to the guide rail; a screen supporting member configured to support the windscreen; and a link mechanism provided between the slide member and the screen supporting member; wherein said link mechanism is configured to increase a movement amount of the screen supporting member to an amount greater than a sliding length of the slide member on the guide rail, wherein the guide rail is formed in a linear shape extending upward toward the rear along a vehicle body front portion; and an angle of the screen support member and a distance of the screen supporting member with respect to the slide member are changed through the link mechanism according to a sliding position of the slide member.

2. The windshield device for a saddle-ride type vehicle according to claim 1, wherein the link mechanism comprises: a first link which is swingably coupled to each of the slide member and the screen supporting member; a second link which is swingably coupled at one end thereof to a vehicle body; and a third link which has a center of swinging provided in the slide member, and which is swingably coupled at one end and another end thereof with the screen supporting member and another end of the second link, respectively.

3. The windshield device for a saddle-ride type vehicle according to claim 1, further comprising another guide rail; wherein a pair of the guide rails are provided on left and right sides of the vehicle, and the link mechanism is disposed between the pair of left and right guide rails.

4. The windshield device for a saddle-ride type vehicle according to claim 2, further comprising another guide rail; wherein a pair of the guide rails are provided on left and right sides of the vehicle, and the link mechanism is disposed between the pair of left and right guide rails.

5. The windshield device for a saddle-ride type vehicle according to claim 2, wherein said vehicle has a fixing member formed thereon to which the second link is coupled; and wherein said fixing member is disposed below the guide rail when viewed in a side view.

6. The windshield device for a saddle-ride type vehicle according to claim 3, wherein said vehicle has a fixing member formed thereon to which a second link is coupled; and wherein said fixing member is disposed below each of the guide rails when viewed in a side view.

7. A windshield device for a saddle-ride type vehicle, said vehicle comprising a plurality of cowls covering vehicle body portions a windscreen; a guide rail fixed to one of said plurality of cowls; a slide member movably attached to the guide rail; a screen supporting member configured to support the windscreen; and a link mechanism which links the slide member with the screen supporting member; wherein said link mechanism configured to increase a movement amount of the screen supporting member to an amount greater than a sliding length of the slide member,
wherein the link mechanism comprises: a first link which is swingably coupled to each of the slide member and the screen supporting member; a second link which is swingably coupled at first end thereof to a vehicle body; and a third link which has a center of swinging provided in the slide member, and which is swingably coupled at first end and second end thereof with the screen supporting member and second end of the second link, respectively.

8. The windshield device for a saddle-ride type vehicle according to claim 7, wherein: during operation, a distance between the screen supporting member and the slide member is changed according to a sliding position of the slide member on the guide rail.

9. The windshield device for a saddle-ride type vehicle according to claim 7, further comprising another guide rail; wherein the link mechanism is disposed between the pair of left and right guide rails.

10. The windshield device for a saddle-ride type vehicle according to claim 7, wherein said screen support member and said guide rail are arranged parallel to each other.

11. A saddle-ride type vehicle comprising a windscreen; a guide rail fixed to a front portion of the vehicle; a slide member movably attached to the guide rail; a screen supporting member configured to support the windscreen; and a link mechanism which links the slide member with the screen supporting member; wherein said link mechanism configured to increase a movement amount of the screen supporting member to an amount greater than a sliding length of the slide member,
wherein the link mechanism comprises: a first link which is swingably coupled to each of the slide member and the screen supporting member; a second link which is swingably coupled at first end thereof to a vehicle body; and a third link which has a center of swinging provided in the slide member, and which is swingably coupled at first end and second end thereof with the screen supporting member and second end of the second link, respectively.

12. The saddle-ride type vehicle according to claim 11, wherein during operation, a distance between the screen supporting member and the slide member is changed according to a sliding position of the slide member.

13. The saddle-ride type vehicle according to claim 11, wherein said first link and said third link are mounted such that said slide member and said screen supporting member are positioned parallel to each other.

14. The saddle-ride type vehicle according to claim 11, wherein said screen support member, said slide member and said guide rail are arranged parallel to each other.

15. The saddle-ride type vehicle according to claim 11, further comprising a cable drive mechanism operatively connected with said slide member.

* * * * *